United States Patent [19]

De Bont et al.

[11] Patent Number: 5,936,047
[45] Date of Patent: Aug. 10, 1999

[54] MOLECULAR WEIGHT CONTROL

[75] Inventors: Johannes J. De Bont, Wouw; Theodorus L. Hoeks, Bergen op Zoom, both of Netherlands

[73] Assignee: General Electric Company, Pittsfield, Mass.

[21] Appl. No.: 08/912,712

[22] Filed: Aug. 18, 1997

[51] Int. Cl.⁶ .................................................. C08G 283/02
[52] U.S. Cl. ............................................ 525/462; 525/469
[58] Field of Search ...................................... 525/462, 469

[56] References Cited

U.S. PATENT DOCUMENTS

| | | | |
|---|---|---|---|
| 2,999,835 | 9/1961 | Goldberg | 524/267 |
| 3,028,365 | 4/1962 | Schell et al. | 528/196 |
| 3,153,008 | 10/1964 | Fox | 528/196 |
| 3,169,121 | 2/1965 | Goldberg | 528/173 |
| 3,240,755 | 3/1966 | Cawthon et al. | 528/198 |
| 3,635,895 | 1/1972 | Kramer | 525/462 |
| 3,989,672 | 11/1976 | Vestergaard | 528/199 |
| 4,001,184 | 1/1977 | Scott | 528/196 |
| 4,487,896 | 12/1984 | Mark et al. | 525/439 |
| 5,414,057 | 5/1995 | Campbell et al. | 525/462 |
| 5,650,470 | 7/1997 | McCloskey et al. | 525/462 |
| 5,652,312 | 7/1997 | Phelps et al. | 525/462 |

*Primary Examiner*—Terressa Mosley

[57] ABSTRACT

The weight average molecular weight of a polycarbonate resin is predictably reduced by reaction with a multifunctional aliphatic compound at a temperature of 250 C. to 350 C.

8 Claims, No Drawings

MOLECULAR WEIGHT CONTROL

BACKGROUND OF THE INVENTION

1. Field of the Invention

The invention relates to processes for preparing synthetic polymeric resins under molecular weight controlling conditions and more particularly relates to processes for controlling the weight average molecular weight of polycarbonates.

2. Brief Description of Related Art

The preparation of synthetic polymeric resins by the condensation or step-reaction polymerization of one or more monomer reactants is well known and includes the preparation of polycarbonate resins. Generally, the degree of polymerization is controlled by the proportion of at least one reactant in the polymerization. Often the controlling reactant is a compound which, when incorporated into the polymerization reaction, terminates the forming polymer chain. Such compounds are sometimes referred to as "endcappers" or "chain-stoppers." The compounds are in fact molecular weight regulators. Unfortunately, these molecular weight regulators react in the polymerization randomly, i.e., they will terminate chain length propagation haphazardly and not predictably so that the resin products are mixtures of polymer chains of various and random lengths (molecular weights).

By fixing the stoichiometry and reaction conditions, typically in batch preparations, one can usually come close to reproducing batches which are substantially alike in terms of a weight average molecular weight ($M_w$). However, even these batches show weight average molecular weight ($M_w$) variation from each other. The problem of eliminating these variations is of commercial importance, since the end user of the resin requires uniformity in physical properties of molded products. Generally, specifications are to be met in terms of molecular weights ($M_w$).

Those skilled in the art will appreciate the commercial importance of preparing synthetic polymeric resins, which are consistently uniform in their physical properties (especially in regard to weight average molecular weight). One example of an effort to achieve this goal (in respect to polycarbonate preparation) is described in the U.S. Pat. No. 3,240,755 (Cawthon et al., 1966). This Patentee employed in the process fractional extraction with selected solvents which would separate polycarbonate resin chains of differing molecular weights. However, among the separated fractions, there remained considerable variations in the product weight average molecular weights.

The process of the present invention is an improvement in the art, particularly in respect to obtaining consistent weight average molecular weights in a resin product.

We have now found that the weight average molecular weight of a given polycarbonate resin can be controlled and made more homogeneous by addition of reactive multifunctional aliphatic compounds. The weight average molecular weight of batches of polycarbonate can be adjusted to a predetermined value.

Reactive multifunctional aliphatic compounds react with polycarbonate in a non-catalyzed reaction. The amount reacted determines the ultimate weight average molecular weight of the polycarbonate resin batch. The reactive aliphatic compound is converted to a harmless, unreactive, cyclic carbonate. The latter is demonstrated by subjecting the polycarbonate resin product to heat treatment. Heat treatments do not influence the $M_w$ of the product dramatically. The process of the invention can be used to tailor-make resins with specific weight average molecular weight. This would enable one to reduce the inventory of linear polycarbonate resins produced by the interfacial process.

One of the difficulties, prior to this invention, in achieving consistent, narrow weight average molecular weight ranges in the preparation of polycarbonates is related to impurities in the dihydric phenols (I) described above. For example, bisphenol A of even the highest purity includes contaminant compounds which can act as molecular weight regulators (chain stoppers) or their equivalents. Representative of such equivalents are o, p'-bisphenol A, chroman I, spirobindane (6, 6¹-dihydroxy-3,3,3',3'-tetramethylspiro(bis)indane) and the like which are normally present, in varying quantities, as impurities associated with dihydric phenols like bisphenol A. It is difficult to take into consideration their presence, at the beginning of polymerization because of the variability of their presence. However, they can be accounted for as molecular weight controlling factors during polymerization according to the process of the present invention.

SUMMARY OF THE INVENTION

The invention comprises a process for controlling the weight average molecular weight of an aromatic polycarbonate resin, which comprises;

providing a polycarbonate resin of a first weight average molecular weight; and reacting with the provided resin a multifunctional aliphatic compound;

whereby there is obtained a resin of lower weight average molecular weight.

Advantages of the process of the invention include less costs involved in manufacturing and maintaining inventory of fewer $M_w$ ranges of resin.

DETAILED DESCRIPTION OF THE PREFERRED EMBODIMENTS OF THE INVENTION

Aromatic polycarbonate resins are a well-known class of synthetic polymeric resins, generally prepared by the reaction of a polyhydric phenol with a carbonate precursor; see for example U.S. Pat. No. 3,989,672, which is incorporated herein by reference thereto.

Dihydric phenol reactants employed to prepare the polycarbonate resins are generally well known compounds as are methods of their preparation. Representative of such dihydric phenols are phenolic diols of the general formula:

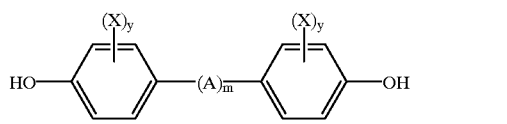

(I)

wherein A is selected from the group consisting of a divalent hydrocarbon radical containing from 1 to about 15 carbon atoms; a halogen substituted divalent hydrocarbon radical containing from 1 to about 15 carbon atoms and divalent groups such as:

$$-S-;$$

-continued

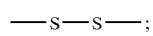

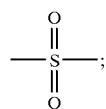

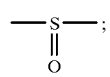

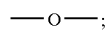

or

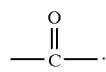

Each X in formula (I) is independently selected from the group consisting of halogen, hydrocarbyl such as an alkyl group of from 1 to about 8 carbon atoms; an aryl group of from 6–18 carbon atoms, an aralkyl group of from 7 to about 14 carbon atoms, an oxyalkyl group of from 1 to about 8 carbon atoms, and an oxyaryl group of from 6 to 19 carbon atoms; wherein m is zero or 1 and y is a whole number integer of from 0 to 4, inclusive.

Typical of some of the dihydric phenols that are advantageously employed are bis-phenols such as bis(4-hydroxyphenyl) methane, 2,2-bis(4-hydroxy-3-methylphenyl)propane, 4,4-bis(4-hydroxyphenyl)-heptane, 2,2-bis(4-hydroxy-3,5-dichlorophenyl)-propane, 2,2-bis(4-hydroxy-3,5-dibromophenyl)-propane, dihydric phenyl ethers such as bis(4-hydroxphenyl)ether, bis(3,5-dichloro-4-hydroxyphenyl)ether; dihydroxybiphenols such as p,p'-dihydroxybiphenol, 3,3'-dichloro4,4'-dihydroxybiphenyl; dihydroxyaryl sulfones such as bis(4-hydroxyphenyl) sulfone, bis(3,5-dimethyl-4-hydroxyphenyl)sulfone; dihydroxy benzenes such as resorcinol and hydroquinone; halo- and alkyl-substituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl)sulfide and bis(4-hydroxyphenyl)sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with a glycol.

Preferred dihydric phenols of Formula (I) are the 4,4'-bisphenols, and particularly bisphenol A.

The carbonate precursor employed in the preparation of resins of the present invention may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bishaloformates of 2,3-bis(4-hydroxyphenyl)propane, hydroquinone, and the like; or the bischloroformates of glycols such as the bischloroformates of ethylene glycol, neopentylene, glycol, poly-ethylene glycol, and the like. Typical of the diarylcarbonates which may be employed are diphenyl carbonate, and the di(alkylphenyl)-carbonates such as di(tolyl) carbonate. Some other non-limiting illustrative examples of suitable diarylcarbonates include di(naphthyl)carbonate, phenyl tolyl carbonate, and the like.

The preferred carbonate precursors are the carbonyl halides, with carbonyl chloride, also known as phosgene, being the preferred carbonyl halide.

The term "polycarbonate" as used herein is inclusive of copolyester-polycarbonates, i.e.; resins which contain, in addition to recurring polycarbonate chain units of the formula:

wherein D is a divalent aromatic radical of the dihydric phenol employed in the polymerization reaction, repeating or recurring carboxylate units, for example of the formula:

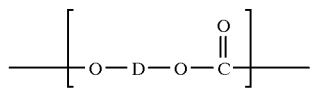

wherein $R^2$ is as defined below.

In general the copolyester-polycarbonate resins are prepared as described above for the preparation of polycarbonate homopolymers, but by the added presence of a difunctional carboxylic acid (ester precursor) in the water immiscible solvent, described hereinafter.

In general, any difunctional carboxylic acid (dicarboxylic acid) conventionally used in the preparation of linear polyesters may be utilized in the preparation of the copolyester-carbonate resins of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

$$R^1-(-R^2-)_q-COOH \qquad (II)$$

wherein $R^2$ is an alkylene, alkylidene, or cyclo-aliphatic group; an alkylene, alkylidene or cyclo-aliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^1$ is either a carboxyl or a hydroxyl group. The letter q represents the integer one where $R^1$ is a hydroxyl group and either zero or one where $R^1$ is a carboxyl group.

Conveniently available aromatic dicarboxylic acids are those represented by the general formula:

(III)

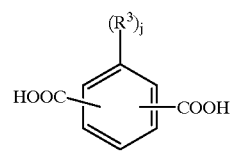

wherein j is a positive whole integer having a value of from 0 to 4 inclusive; and each $R^3$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid or dicarboxylic is used herein it is to be understood that the terms include mixtures of two or more different difunctional carboxylic acids as well as individual carboxylic acids.

Most preferred as aromatic dicarboxylic acids are isophthalic acid, terephthalic acid, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, sometimes even preferred, to employ the reactive derivatives of said acid. Illustrative of these reactive derivatives are the acid halides. The preferred acid halides are the acid dichlorides and the acid dibromides. For example, instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins will vary in accordance with the proposed use of the product resin. Those skilled in the art are aware of useful proportions, as described in the U.S. Pat. Nos. 3,169,121 and 4,487,896. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

Also included within the scope of the instant invention are preparation of randomly branched polycarbonate resins wherein a minor amount (typically between 0.05 and 2 mole percent, based on the quantity of dihydric phenol used) of a polyfunctional aromatic compound is a co-reactant with the dihydric phenol in the reaction mixture, comprising also the carbonate precursor and optionally the ester precursor; to provide a thermoplastic randomly branched polycarbonate. These polyfunctional aromatic compounds may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anyhdride, trimesic acid, benzophenonetetra-carboxylic acid, benzophenone-tetracarboxylic acid anhydride, and the like. Other organic polyfunctional compounds useful in making randomly branched polycarbonates are disclosed in U.S. Pat. Nos. 3,635,895 and 4,001,184, both of which are incorporated herein by reference.

The commercially important process for the preparation of aromatic polycarbonate resins is the well-known interfacial polymerization process.

Although the reaction conditions of the preparative processes may vary, several of the preferred processes typically involve dissolving or dispersing the diphenol reactants in aqueous caustic and suitable water immiscible solvent medium. A catalyst is added and the resulting mixture brought into contact with the carbonate precursor, such as phosgene, under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The temperature at which the reaction proceeds may vary from below 0 C., to above 100 C. The reaction preferably proceeds at temperatures of from room temperatures (25 C.) to 50 C. Since the reaction is exothermic, the rate of carbonyl halide addition may be used to control the reaction temperature. The amount of carbonyl halide required will generally depend upon the amount of the dihydric phenol and the amount of any dicarboxylic acid also present.

In the conventional interfacial polymerization methods of preparing polycarbonates, a molecular weight regulator (a chain stopper) is generally added to the reaction mixture prior to or during the contacting with a carbonate precursor. Useful molecular weight regulators include, but are not limited to, monohydric phenols such as phenol, chroman-I, paratertiarybutylphenol, p-cumylphenol and the like. Techniques for the control of molecular weight with chain-stoppers are well known in the art and are used for controlling the weight average molecular weight of the polycarbonate resins. In general, the greater the proportion of chain stopper added to the reaction mixture, the lower will be the weight average molecular weight of the product resin. Control of the weight average molecular weight may therefore be accomplished to some degree by the proportion of chain stopper present in the reaction mixture.

The polycarbonate resins prepared as described above may have a weight average molecular weight ($M_w$) of from about 2,000 to about 200,000, and an intrinsic viscosity, as measured in methylene chloride at 25° C., of at least about 0.3 d /gm. Molecular weights ($M_w$) may be determined by known methods such as by gel permeation chromatography (GPC) in chloroform relative to polystyrene standards using a UV detector at 254 nm.

Within the broad range of molecular weights available to users of polycarbonate resins, there is a need for resins of very particular weight average molecular weights within certain narrow ranges. Most important is consistency of resin product $M_w$ specifications within certain narrow molecular weight ranges so that products of ultimate use are consistently uniform. The process of the present invention permits continuous consistent manufacture of resins, within pre-determined, narrow weight average molecular weight ranges.

Once the polycarbonate resin batch is provided and characterized by a given weight average molecular weight ($M_w$), the process of the present invention may be employed to redistribute that $M_w$ downward to a desired lower, predictable value. The process of the invention comprises first admixing with the provided resin a weight average molecular weight reducing quantity of a multi-functional aliphatic compound. Multifunctional aliphatic compounds useful as molecular weight reducing agents are represented by aliphatic polyols. Representative of useful polyols and diols are those of the general formula:

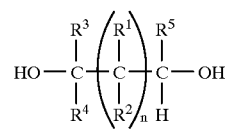

wherein n is a whole integer of from 0 to 10, preferably 0 to 4, $R^1$, $R^2$, $R^3$ and $R^5$ are each independently H, $CH_3$ or $CH_2OH$ and $R^5$ is H, $CH_3$, $CH_2OH$ or $CH_2OC(O)C_{17}H_{37}$. Compounds of the general formula (IV) are well known, as are methods of their preparation. Specific examples of compounds of the formula (IV) include glycol, pentaerythritol, substituted pentaerythritol, mannitol, sorbitol, substituted mannitol and sorbitol derivatives, glycerol monostearate, ethylene glycol, 1,2-propanediol, 1,3-propanediol, 1,4-butanediol, 1,5-pentanediol, 1,6-hexanediol, 1,7-heptanediol, 1,8-octanediol, 1,10-decanediol, 1,12-dodecanediol polyols, substituted polyols, and the like. Preferred compounds are glycerol monostearate, glycol, pentaerythritol, mannitol and sorbitol.

The admixture is reacted by heating to a temperature within the range of from about 250 C. to 350 C. for a period of time sufficient to reduce the $M_w$ of the polycarbonate resin. Reduction can be monitored by periodic analysis and the reaction terminated when a desired reduction is achieved, by cooling the extrudate. Generally, from about 1 to 15 minutes is required. Extrusion in a plastics extruder is a preferred mode of mixing and heating.

The effective proportion of multifunctional aliphatic compound required in the process of the invention is within the range of from about 0.05 to 2 weight percent of the polycarbonate resin. The proportion selected will depend upon the degree of weight average molecular weight reduction desired. In general, the larger the proportion of multifunctional aliphatic compound, the greater will be the reduction. Those skilled in the art can determine exact proportions based on reaction chemistry readily by assuming that no side reactions occur, the total polymer mass remains constant and the total mass of reagents is negligible compared to the polymer mass. The predictive formula based on these assumptions is $$X_{diol} = \left( \frac{1}{M_{nn}} - \frac{1}{M_{no}} \right) \frac{M_{diol}}{C}$$

in which $M_{nn}$ is the required number average molar mass $M_{no}$ is the number average mass of starting material $M_{diol}$ is the molecular weight of the diol C is the conversion and $X_{diol}$ is the amount of diol needed.

In a preferred embodiment process of the invention, the above-described reaction may be facilitated by conducting the reaction in the presence of a strong base, such as for example, sodium hydroxide, potassium hydroxide, tetrabutylphosphonium hydroxide and the like. The presence accelerates the desired reaction, especially in an extruder. Although a strong base is not required to carry out the reaction, if it is to be used, the proportion of base is advantageously within the range of from about 1 to 25 ppm of the polycarbonate resin.

The following examples and preparations describe the manner and process of making and using the invention and set forth the best mode contemplated by the inventors of carrying out the invention but are not to be construed as limiting the invention. Where reported, the following tests were carried out:

Intrinsic Viscosity

The intrinsic viscosity was measured at a temperature of 25 C in methylene chloride and is reported in deciliters/gram (d /g). Melt Volume Rate at 250 C, weight is 1.2kg, for 4 minutes following the procedure of ASTM 1238.

Molecular Weight ($M_w$)

The weight average molecular weight ($M_w$) may be determined by gel permeation chromatography (GPC) in chloroform relative to polystyrene standards using a UV detector at 254 nm. Other methods such as by light-scattering technique will be appreciated by those skilled in the art.

EXAMPLES 1–3

A quantity of polycarbonate molding resin (LEXAN(® 105, General Electric Company, Pittsfield, Mass.) having a weight average molecular weight of about 30,500 was divided into 3 portions. One portion was left unmodified (Example 1), one portion was mixed with 0.49 parts by weight of glycerol monostearate (Example 2) and the third portion with 0.2 parts by weight of terpene-phenol oligomer (Example 3). Each of the three resin batches was then extruded a plurality of times from an extruder with temperature settings in zones starting from the feed section of 40° C., 200° C., 260° C. and 300° C. to the die. The extrudate is allowed to cool between extrusions and tested for $M_w$ and MVR. The test results are set forth in the Table 1, below. Residence times in the extruder ranged from about 25 to about 75 seconds. Extrusions temperature settings will vary from one extruder to another as well as from one extruder screw configuration to another. Higher extruder temperature settings in the melt zone in the range of 320° C. to 340° C. appear to give better results. Melt temperatures at the die range usually from 350° C. to 360° C., preferably from 310° C. to 350° C. and more preferably from 320° C. to 340° C.

TABLE 1

| Test | Example 1 (Control) | Example 2 | Example 3 |
|---|---|---|---|
| MVR (300'C./1.2 kg) | | | |
| 1-pass-extrudate | 8.9 22.7 | 9.0 | |
| 2-pass extrudate | 10 24.5 | 9.7 | |
| 3-pass extrudate | 11.125.4 | 10.8 | |
| $M_w$ | | | |
| 1-pass-extrudate | 28880 | 23270 | 29200 |
| 2-pass extrudate | 27560 | 23230 | 29700 |
| 3-pass extrudate | 26800 | 23060 | 28200 |

EXAMPLES 4–7

A polycarbonate resin was provided having a $M_w$ of about 21580 and an MVR(4) of 4.2. The resin was divided into 4 portions, each of which was mixed with a proportion of ethanediol. In Example 7, 10 PPM of sodium hydroxide was also added. After mixing and extrusion at a temperature of 300 C., samples were tested for $M_w$ and MVR. The test results are set forth in Table 2, below.

EXAMPLES 8–10

The procedure of Examples 4–6 above were repeated except the ethanediol was replaced with 1,2-propanediol and the extrusion temperature was 320 C. The test results are set forth below in Table 2.

EXAMPLES 11–12

The procedure of Examples 4–6 above were repeated except the ethanediol was replaced with 1,3-propanediol. The test results are set forth below in Table 2.

TABLE 2

| Example | Added | Molecular Weight | MVR (4) |
|---|---|---|---|
| 4 | 0.2 w/w % ethanediol | 20950 | 6.4 |
| 5 | 0.1 w/w % ethanediol | 20425 | 7.1 |
| 6 | 0.6 w/w % ethanediol | 19000 | 9.5 |
| 7 | 0.4 w/w % ethanediol and 10 ppm NaOH Added | 11710 | 17.1 |
| 8 | 0.25 w/w % 1,2-propane diol | 20370 | 6.5 |
| 9 | 0.50 w/w % 1,2-propane diol | 18715 | 12.5 |
| 10 | 0.75 w/w % 1,2-propane diol | 18350 | 13.2 |
| 11 | 0.25 w/w % propane diol 1–3 | 20300 | 6.8 |
| 12 | 0.50 w/w % propane diol 1–3 | 18900 | 11.1 |

The results in Table 2 show that increasing a level of ethanediol accelerate the reaction. However, significant improvement is observed when small amounts of basic species are added.

EXAMPLES 13–15

The procedure of Examples 1–3 is repeated except that the starting polycarbonate resin had a $M_w$ of 21600 and the extrusion was carried out at 300 C., 320 C. or 340 C. The test results are shown below in Table 3.

TABLE 3

| Example | Added | Molecular Weight | MVR (4) |
|---|---|---|---|
| 13 | 0.4 w/w % Extruder Setting 300 C | 20110 | 7.8 |
| 14 | 0.4 w/w % Extruder Setting 320 C | 19390 | 9.2 |
| 15 | 0.4 w/w % Extruder Setting 340 C | 18460 | 11.3 |

The results shown in Table 3 show the strong dependence of the reaction on temperature. At a temperature of 320 C. the reaction is sluggish. One can enhance a reaction below 300 C., if one adapts the screw-configuration of the extruder.

What is claimed is:

1. A process for controlling the weight average molecular weight of an aromatic polycarbonate resin, which comprises;

heating to a melt temperature within the range of from 250° C. to 350° C. a polycarbonate resin of a first weight average molecular weight; and reacting with the polycarbonate resin a multifunctional aliphatic compound of the formula:

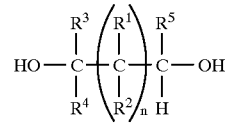

wherein n is a whole integer of from 0 to 10, $R^1$, $R^2$, $R^3$ and $R^5$ are each independently H, $CH_3$ or $CH_2OH$ and $R^5$ is H, $CH_3$, $CH_2OH$ or $CH_2OC(O)C_{17}H_{37}$;

whereby there is obtained a polycarbonate resin of lower weight average molecular weight.

2. The process of claim 1 wherein the range is from about 310° C. to about 350° C.

3. The process of claim 1 wherein the multifunctional aliphatic compound is selected from the group consisting of ethanediol, 1,2-propanediol, 1,3-propanediol glycerol monostearate, glycol, pentaerythritol, mannitol and sorbitol.

4. The process of claim 1 wherein reacting is in the presence of a strong base.

5. The process of claim 4 wherein the base is present in an amount of from about 1 to 25 ppm of the polycarbonate resin.

6. The process of claim 1 wherein n is a whole integer of from 0 to 4.

7. The process of claim 1 wherein the multifunctional aliphatic compound is present in the amount of from about 0.05 to 2 weight percent of the polycarbonate resin.

8. The process of claim 1 wherein the reaction takes place in an extruder.

* * * * *